United States Patent Office 3,598,592

Patented Aug. 10, 1971

3,598,592

STORAGE-STABLE PHOTOSENSITIVE AMINOTRIARYLMETHANE/SELECTED ORGANIC PHOTOOXIDANT COMPOSITIONS

Lawrence Anthony Cescon, Wilmington, Del., assignor to E. I. du Pont de Nemours and Company, Wilmington, Del.

No Drawing. Continuation-in-part of abandoned application Ser. No. 363,624, Apr. 29, 1964. This application Nov. 7, 1967, Ser. No. 681,118

Int. Cl. G03c 1/00, 1/76

U.S. Cl. 96—85 12 Claims

ABSTRACT OF THE DISCLOSURE

Storage-stable light-sensitive compositions comprising an aminotriarylmethane or salt thereof and a selected photooxidant. The aminotriarylmethane contains at least two phenyl groups having a disubstituted amino group para to the methane carbon and an alkyl, alkoxy, halo or butadienylene group ortho to the methane carbon. The photooxidants are halogenated hydrocarbons, halogenated substituted hydrocarbons, sulfonyl halides, sulfenyl halides, tetraarylhydrazines, benzothiazolyl disulfides, polymethacrylaldehyde or alkylidene-2,5-cyclo-hexadien-1-one. When irradiated with light the photooxidant becomes activated and oxidizes the aminotriarylmethane to its colored form. The compositions are useful in photocopying, photoduplicating, micro-imaging and photographic applications.

CROSS REFERENCES TO RELATED APPLICATIONS

This application is a continuation-in-part of application Ser. No. 363,624, filed Apr. 29, 1964 and now abandoned.

BACKGROUND OF THE INVENTION

(1) Field of the invention

This invention is concerned with storage-stable, light-sensitive, color-forming compositions. More particularly, the compositions of this invention comprise a selected aminotriarylmethane color-former and a selected photooxidant. The invention is also directed to a process for forming color employing such compositions.

(2) Description of the prior art

Light-sensitive systems containing a photooxidant and an aminotriarylmethane as the color-forming component have been known for some time. One such system described in U.S. Pat. 3,042,515 utilizes a certain leuco aminotriarylmethane dye as the color-forming component and a certain organic halogen compound as the photooxidant component. More recently it has been disclosed that an intimate mixture of an aminotriarylmethane as the color-forming component and a hexaarylbiimidazole as the photooxidant component comprises still another such photosensitive system. In these systems, light of a specified wavelength activates the photooxidant which in its activated state oxidizes the leuco aminotriarylmethane to the colored form.

However, in the fields of photocopying, photoduplication, microimaging and classical photography, it is desirable that the light-sensitive systems or composition employed must, before exposure to light, undergo essentially no color change under ordinary darkroom storage conditions and yet retain the ability to form color when exposed to light of suitable wavelength. That this requirement is not met satisfactorily by previously reported light-sensitive compositions and systems containing aminotriarylmethanes as the color-forming component is evident from the disclosures of the aforementioned U.S. Pat. 3,042,515. According to this patent, the addition to the light-sensitive composition of such bases as alkylamines, zinc oxide and the like is required to provide photosensitive systems possessing long-term, useful dark storage stability. Moreover, such systems require extra materials' handling and yield compositions containing amines which are malodorous or solids which hinder the preparation of haze-free photosensitive films.

It is therefore an object of this invention to provide a novel photosensitive composition which will develop color rapidly when exposed to light of certain wavelengths but which will not undergo color formation under ordinary darkroom storage conditions.

SUMMARY OF THE INVENTION

The compositions of the invention comprise (A) (1) at least one aminotriarylmethane wherein at least two of the aryl groups are phenyl groups having (a) an $R_1R_2N$-substituent in the position para to the bond to the methane carbon atom wherein $R_1$ and $R_2$ are each groups selected from $C_1$ to $C_{10}$ alkyl, 2-hydroxyethyl, 2-cyanoethyl, benzyl or phenyl, and (b) a group ortho to the methane carbon atom which is selected from lower alkyl, lower alkoxy, fluorine, chlorine, bromine or butadienylene which when joined to the phenyl group forms a naphthalene ring; and the third aryl group, when different from the first two, is selected from thienyl, furyl, oxazylyl, thiazolyl, indolyl, benzoxazolyl, benzothiazolyl, phenyl, or such aforelisted groups substituted with lower alkyl, lower alkoxy, methylenedioxy, fluoro, chloro, bromo, amino, lower alkylamino, lower dialkylamino, loweralkylthio, hydroxy, carboxy, carbonamido, lower carbalkoxy, lower alkylsulfonyl, lower alkylsulfonamido, $C_6$ to $C_{10}$ arylsulfonamido, nitro or benzylthio; or (A) (2) at least one salt of an aminotriarylmethane defined above which is derived from a strong acid; in intimate admixture with (B) at least one organic photooxidant reactive with the component defined in (A)(1) or (A)(2) above under the influence of light selected from (a) a halogenated compound having a bond dissociation energy to produce a first halogen as a free radical of not less than about 40 kilogram calories per mole, (b) a sulfonyl halide, $$R—SO_2—X$$

wherein R is a member of the group consisting of alkyl, alkenyl, cycloalkyl, aryl, alkaryl, or aralkyl and X is chlorine or bromine, (c) a sulfenyl halide of the formula R′—S—X′ wherein R′ and X′ have the same meaning as R and X in $RSO_2X$ above, (d) a tetraaryl hydrazine, (e) a benzothiazolyl disulfide, (f) a polymethacrylaldehyde, or (g) an alkylidene-2,5-cyclohexadien-1-one.

The compositions are useful for photography and photographic reproduction purposes. They remain essentially unchanged in color in the dark but undergo a distinct color change to form a sharp image when exposed to a pattern of light.

The term "lower" as used herein is defined as meaning 1 to 6 carbon atoms.

The third aryl group of the aminotriarylmethane defined in part (A)(1) of the above definition of the invention is preferably the same as the other two aryl groups. But when it is different from the other two aryl groups, it is preferably oxazylyl, thiazolyl, indolyl, benzoxazolyl, benzthiazolyl, phenyl, or such aforelisted groups substituted with lower alkyl, fluoro, chloro, bromo, amino, lower alkylamino, lower dialkylamino, lower alkylthio, hydroxy, carboxy, carbonamido, lower carbalkoxy, lower alkylsulfonyl, lower alkylsulfonamido, $C_6$ to $C_{10}$ arylsulfonamido, nitro or benzylthio.

DESCRIPTION OF THE INVENTION

(A) The aminotriarylmethane component

The nature of the aminotriarylmethanes or acid salts thereof, which serve as the color-forming components, mainly determines the dark stability (storage stability in the absence of light at room temperature) of the invention compositions. Whereas many aminotriarylmethanes not covered by the definition recited above are not stable under ordinary darkroom conditions and undergo a color-forming dark reaction which leads to fogging or coloration of photographic films, papers or other systems containing the compositions, it has been discovered that aminotriarylmethanes possessing the structural features recited above are stable to darkroom conditions and do not undergo color-formation when stored therein. A principal factor responsible for this color-forming dark reaction is believed to be air oxidation. Although it is usually possible to prevent the color-forming dark reaction in light-sensitive compositions containing aminotriarylmethanes which do not possess the structural features of the invention compounds by storing such compositions in the absence of air, such anaerobic conditions are difficult and costly to maintain and are impractical in the modern practice of the photographic arts.

Preferred aminotriarylmethanes of this invention are represented by the following structural formula:

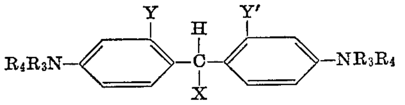

wherein $R_3$ and $R_4$ are selected from lower alkyl (preferably ethyl) or benzyl, Y and Y' are lower alkyl (preferably methyl) and X is selected from

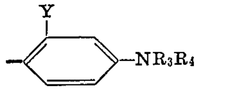

wherein Y, $R_3$ and $R_4$ are defined as set forth previously in this same sentence, p-methoxyphenyl, 2-thienyl, phenyl, 1-naphthyl, 2,3-dimethoxyphenyl, 3,4-methylenedioxyphenyl, or p-benzothiophenyl. Preferably X is selected from

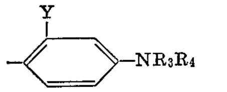

wherein Y, $R_3$ and $R_4$ are defined as set forth in the preceding sentence, phenyl, 1-naphthyl, or p-benzothiophenyl.

If necessary to fully develop the dye color under imaging conditions, these amino substituted cationic dye precursors may be employed in the color-forming process as salts of strong acids: for example, mineral acids such as hydrochloric, hydrobromic, sulfuric, nitric, phosphoric; organic acids such as acetic, oxalic, p-toluenesulfonic, trichloroacetic acid, trifluoroacetic acid, perfluoroheptanoic acid; and Lewis acids such as zinc chloride, zinc bromide, and ferric chloride; the proportion of acid usually varying from 0.33 mole to 1 mole per amino group. The term "strong acid" as used herein is defined as an acid which forms a salt with an anilino amino group.

Specific examples of the aminotriarylmethanes of this invention are:

bis(2-bromo-4-diethylaminophenyl)phenylmethane,
bis(2-butoxy-4-diethylaminophenyl)phenylmethane,
bis[4-(2-cyanoethyl)(2-hydroxyethyl)amino-o-tolyl](p-benzylthiophenyl)methane, bis[4-(2-cyanoethyl)(2-hydroxyethyl)amino-o-tolyl]-2-thienylmethane,
bis(4-dibutylamino-o-tolyl)-2-thienylmethane,
bis(4-diethylamino-2-ethylphenyl)(3,4-methylenedioxyphenyl)methane,
bis(4-diethylamino-2-fluorophenyl)(p-benzylthiophenyl)methane,
bis(4-diethylamino-2-fluorophenyl)(3,4-methylenedioxyphenyl)methane,
bis(4-diethylamino-2-methoxyphenyl)(p-nitrophenyl)methane,
bis(4-diethylamino-1-naphthyl)(4-diethylamino-o-tolyl)methane,
bis(4-diethylamino-o-tolyl)(p-benzylthiophenyl)methane,
bis(4-diethylamino-o-tolyl)(2,4-dimethoxyphenyl)methane,
bis(4-diethylamino-o-tolyl)-2-furylmethane,
bis(4-diethylamino-o-tolyl)(p-methoxyphenyl)methane,
bis(4-diethylamino-o-tolyl)-3,4-methylenedioxyphenyl)methane,
bis(4-diethylamino-o-tolyl)(p-methylthiophenyl)methane,
bis(4-diethylamino-o-tolyl)-1-naphthylmethane,
bis(4-diethylamino-o-tolyl)phenylmethane,
bis(4-diethylamino-o-tolyl)-2-thienylmethane,
tris(4-dimethylamino-2-chlorophenyl)methane,
bis(4-dimethylamino-2,5-dimethylphenyl)phenylmethane,
bis(4-dimethylamino-2-hexylphenyl)(p-butylthiophenyl)methane,
bis(4-dimethylamino-o-tolyl)(o-bromophenyl)methane,
bis[4-(N-ethylanilino)-o-tolyl](3,4-dibutoxyphenyl)methane,
bis(4-ethylbenzylamino-o-tolyl)(p-methoxyphenyl)methane,
bis[4-bis(2-hydroxyethyl)amino-2-fluorophenyl](p-benzylthiophenyl)methane,
tris(4-diethylamino-o-tolyl)methane,
tris(p-dioctylamino-o-tolyl)methane,
bis(4-diethylamino-o-tolyl)(2-diethylamino-4-methyl-5-thiazolyl)methane,
bis(4-diethylamino-o-tolyl)(2-diethylamino-5-methyl-6-benzoxazolyl)methane,
bis(4-diethylamino-o-tolyl)(2-diethylamino-5-methyl-6-benzothiazolyl)methane,
bis(4-diethylamino-o-tolyl)(1-ethyl-2-methyl-3-indolyl)methane,
bis(4-diethylamino-o-tolyl)(1-benzyl-2-methyl-3-indolyl)methane,
bis(4-diethylamino-o-tolyl)(1-ethyl-2-methyl-5-methoxyl-3-indolyl)methane,
tris(4-diethylamino-2-fluorophenyl)methane,
tris(4-dimethylamino-2-fluorophenyl)methane,
bis(4-diethylamino-o-tolyl)-p-chlorophenyl methane,
bis(4-diethylamino-o-tolyl)-p-bromophenyl methane,
bis(4-diethylamino-o-tolyl)-p-fluorophenyl methane,
bis(4-diethylamino-o-tolyl)-p-tolyl methane,
bis(4-diethylamino-o-tolyl)-4-methoxy-1-naphthyl methane,
bis(4-diethylamino-o-tolyl)-3,4,5-trimethoxyphenyl methane,
bis(4-diethylamino-o-tolyl)-p-hydroxyphenyl methane,
bis(4-diethylamino-o-tolyl)-3-methylthienyl methane,
5-[bis(4-diethylamino-o-tolyl)-methyl]-2,3-cresotic acid,
4-[bis(4-diethylamino-o-tolyl)-methyl]-phenol,
4-[bis(4-diethylamino-o-tolyl)-methyl]-acetanilide,
4-[bis(4-diethylamino-o-tolyl)-methyl]-phenylacetate,
4-[bis(4-diethylamino-o-tolyl)-methyl]-benzoic acid,
4-[bis(4-diethylamino-o-tolyl)-methyl]-diphenyl sulfone,
4-[bis(4-diethylamino-o-tolyl)-methyl]-phenylmethyl sulfone,
4-[bis(4-diethylamino-o-tolyl)-methyl]-methylsulfonanilide,
4-[bis(4-diethylamino-o-tolyl)-methyl]-p-tolylsulfonanilide, and
bis(4-diethylamino-o-tolyl)-p-nitrophenyl methane.

(B) The photooxidant

The photooxidant components employed in the compositions of this invention are characterized by the ability to oxidize the aminotriarylmethane or its salt when irradiated with light.

The halogenated compounds having a bond dissociation energy to produce a first halogen as a free radical of not less than about 40 kilograms calories per mole are described in U.S. Pat. 3,042,515 and comprise halogenated hydrocarbons and halogenated substituted hydrocarbons. Also, in the halogenated hydrocarbons, at least one active halogen selected from the group consisting of Cl, Br, and I is attached to a carbon atom having not more than one hydrogen attached thereto. Specific examples of such halogenated hydrocarbons which may be used for the purpose of this invention include:

bromodichloromethane,
bromotrichloromethane,
carbon tetrabromide,
carbon tetrachloride,
1,2-dibromo-1,1,2,2-tetrachloroethane,
hexachlorobenzene,
hexachloroethane,
iodoform,
1,2,3,4-tetrabromobutane, and
1,1,1,2,2,3,3-heptachloropropane.

Examples of substituted halogenated hydrocarbons include:

tetrabromophenolphthalein,
tetrachlorotetrahydronaphthalene,
N-bromosuccinimide, and
tribromomethylphenyl ketone.

Of this group, the polyhalo aliphatic hydrocarbons are preferred, particularly those which have a relatively low vapor pressure at room temperature, e.g., those having normal boiling points above 200° C. The more highly volatile compounds such as carbon tetrabromide and carbon tetrachloride are effective but present certain difficulties in utilization at room temperature. This defect can be eliminated through encapsulation techniques by which means volatile halocarbon liquids can be incorporated into the invention compositions and retained indefinitely therein without evaporation.

A factor to be considered in the choice of the optimum halogenated compound which serves as the photooxidant is the area of peak sensitivity and the spectral range of sensitivity of the halogenated compound. It is disclosed in U.S. Pat. 3,056,673, that the spectral response to the halogenated photooxidants is, among other things, a function of the particular chosen halogen compound. Iodo compounds absorb at relatively long wavelengths, bromo compounds absorb at intermediate wavelengths and chloro compounds absorb at short wavelengths.

The sulfonyl and sulfenyl halides useful as photooxidants in the invention are those disclosed in U.S. Pat. 3,113,024. The useful sulfonyl halides include those represented by the general formula R—$SO_2$—X where R preferably represents a member of the class consisting of a lower alkyl (e.g. methyl, ethyl, propyl, butyl), aryl (e.g. phenyl, naphthyl) and substituted aryl (e.g. nitrophenyl, bromophenyl, chlorophenyl, acetamidophenyl, etc.) and X is Cl or Br. R can be any organic group linked to the sulfur of sulfonyl chloride through a carbon atom. That is, R can be alkyl, alkenyl, cycloalkyl, aryl, alkaryl, aralkyl, or conjugated, unsaturated or saturated heterocyclic. These groups may be substituted by one or more groups such as alkyl, alkoxy, carboalkoxy, acyloxy, acylamido, acyl, alkenyl, cyano, halogen, nitro, alkylthio, arylthio, alkylsulfnyl, arylsulfinyl, alkylsulfonyl, arylsulfonyl, and alkenylsulfonyl.

Specific examples of sulfonyl halides which may be used in the invention composition are:

ethanesulfonyl bromide,
methanesulfonyl chloride,
3-methyl-1-butanesulfonyl chloride,
2-phenylethanesulfonyl chloride,
p-acetamidobenzenesulfonyl chloride,
1,3-benzenedisulfonyl chloride,
benzenesulfonylbromide,
benzenesulfonyl chloride,
p-chlorobenzenesulfonyl chloride,
2,4-dimethoxybenzenesulfonyl chloride,
2,4-dinitrobenzenesulfonyl chloride,
2-naphthalenesulfonyl bromide,
m-nitrobenzenesulfonyl chloride,
p-nitrobenzenesulfonyl chloride,
3,3'-sulfonyldibenzenesulfonyl chloride, and
p-toluenesulfonyl chloride.

The sulfenyl halides useful in the present invention include those represented by the general formula R'—S—X' wherein R' has the same meaning as in the formula above for the sulfonyl halides and X' represents chlorine or bromine. Among the specific sulfenyl halides which may be employed in the composition of this invention are:

benzenesulfenyl bromide,
benzenesulfenyl chloride,
4-biphenylsulfenyl chloride,
2,4-dinitrobenzenesulfenyl chloride,
p-isopropylbenzenesulfenyl bromide,
1-naphthalenesulfenyl chloride,
o-nitrobenzenesulfenyl chloride,
tetrahydronaphthalenesulfenyl chloride,
p-toluenesulfenyl chloride,
trichloromethanesulfenyl chloride,
trifluoromethanesulfenyl chloride and
2,4-xylenesulfenyl chloride.

The tetraarylhydrazine photooxidants are exemplified by tetraphenylhydrazine, tetra-p-tolylhydrazine, and tetrakis(p-methoxyphenyl)hydrazine. Certain tetraarylhydrazines tend to dissociate thermally to radicals which can oxidize the aminotriarylmethane component. These are operable in the compositions of this invention but require special processing to prevent contact with the aminotriarylmethane until the composition is ready for exposure to light, if they dissociate at storage temperature. One method is to encapsulate the photooxidant in tiny capsules which in turn can be incorporated into the invention compositions and retained indefinitely therein, separate from the aminotriarylmethane color-former, until the capsules are ruptured by pressure, heat or other means.

Benzothiazolyl disulfide photooxidants are exemplified by 2-benzothiazolyl disulfide; while the alkylidene-2,5- cyclohexadien-1-ones are exemplified by 2,6-dimethyl-4-(1, 1,3,3-tetrafluoro-1,3-dichloroisopropylidene) - 2,5 - cyclohexadien-1-one.

Preferred classes of photooxidants employed in this invention are the halogenated hydrocarbons and the sulfonyl halides. Most preferred are the halogenated hydrocarbons, especially the polyhalo aliphatic hydrocarbons.

(C) The process of the invention

Solvents which are essentially inert toward the aminotriarylmethane and the photooxidant are usually employed to dissolve these components and thereby mix them together and to provide a fluid medium for a convenient and ready application of the light-sensitive compositions of this invention to substrates. It is preferable to have at least 0.5% by weight of the solvent retained by such a substrate as paper to ensure optimum image formation upon radiation with light. It is not necessary that the substrate be wet with solvent, humidified, or specially handled. In general, a preferred solvent has a boiling point of at least 60° C. at atmospheric pressure. Solvents with high boiling points that are not readily removed by evaporation may be used when their quantity is restricted as it can be in mixtures with other solvents having relatively high vapor pressures. Representative solvents which may be employed are formamide, N,N-dimethylformamide, N,N-dimethylacetamide, hexanamide, stearamide, acetone, methanol, ethanol, 1-propanol, butanol, ethylene glycol, polyethylene glycols, ethyl acetate, ethyl benzoate, benzene, o-dichlorobenzene, toluene, dimethylsulfoxide, pyridine, tetrahydrofuran, dioxane, and mixtures of these solvents in various proportions as may be required to attain solution of the aminotriarylmethane and the photooxidant selected for use in the light-sensitive composition.

In addition to a residual amount of a solvent, a polymeric binder or matrix may be present in the light-sensitive composition spread over or contained in a substrate. A binder which may optionally be added to the composition is an inert material that serves to adhere the light-sensitive mixture to the substrate. The binder may also serve to thicken the solution of the composition should this be desirable for specific applications. The light-sensitive composition may also be mixed with a polymeric material which can serve as a matrix for the composition and the mixture may be cast, extruded or otherwise formed into unsupported films. These films may then be used for image formation as are the substrates bearing the light-sensitive mixture of aminotriarylmethane and photooxidant. Examples of binders and matrices that will be found applicable are ethyl cellulose, polyvinyl alcohol, polyvinyl chloride, polystyrene, polyvinyl acetate, poly (methyl methacrylate), cellulose acetate, cellulose nitrate, chlorinated rubber, copolymers of vinyl monomers, gelatin. A binder or matrix will be used in an amount varying from about 0.5 part to about 200 parts by weight per part of combined weight of aminotriarylmethane and photooxidant. Amounts within the range of about 0.5 part to 10 parts will be used when the polymer functions as an adhesive or thickener, while higher amounts will be used when the polymer forms an unsupported film containing the light-sensitive composition. With certain polymer matrices, the addition of a plasticizer may be desirable to give flexibility to the film or coating containing the composition.

The substrates are materials to which the light-sensitive compositions may be applied as a coating or impregnant. They are materials commonly used in the graphic arts and in decorative and protective applications. These materials include paper varying in type from tissue paper to heavy cardboard; films of plastics and polymeric materials and polymeric matrices such as regenerated cellulose, cellulose acetate, cellulose nitrate, polyesters of glycol and terephthalic acid, polyethylene, polyvinyl acetate, poly(methyl methacrylate) and the like; textile fabrics; glass; wood; and metals.

A common procedure is to make a solution of the aminotriarylmethane ranging in concentration from about 0.5% by weight to the limit of its solubility in the selected solvent or solvent mixture and to add to this solution a photooxidant in an amount about equivalent on a molar basis to the aminotriarylmethane.

Optionally, a binder as described above may be added to the solution. The selection of the aminotriarylmethane will depend upon the color and quality of the image desired. Two or more aminotriarylmethanes may be used in combination to obtain a particular color or shade of color or to provide a neutral gray or black coloration in the image.

In applying a solution of the light-sensitive composition to paper, films, fabrics, or to the surfaces of rigid substrates such as glass, wood, plastics, or metals, the solution may be sprayed, brushed, applied by a roller or an immersion coater, flowed over the surface, picked up by immersion, or spread by other means. Complete coverage of the substrate may be attained or a pattern of the light-sensitive composition may be printed on the substrate. In impregnating paper, for instance, such concentrations of solution and pick-up by the paper are made so as to provide from about 0.01 mg./in.$^2$ to about 5.0 mg./in.$^2$ of aminotriarylmethane and the equivalent amount of photooxidant.

The substrates bearing the solution of the aminotriarylmethane and photooxidant, and optionally a binder, may be dried simply at room temperature. They also may be dried under vacuum at room temperature or at elevated temperatures.

The aminotriarylmethane and the photooxidant of the invention may be mixed in mole ratios within the range from about 10:1 (leuco dye:photooxidant) to about 1:10. The preferred range is 2:1 to 1:2, while the preferred ratio is about 1:1.

The wavelength of the light which activates the color formation varies with both the photooxidant and the aminotriarylmethane employed. Thus, dependent on the nature of the photooxidant and aminotriarylmethane comprising the invention composition, either ultraviolet or visible light is used as the activation means. In general, the wavelength of this activation light is within the range from about 2000 A. to about 8000 A., with a preferred range being from about 2000 A. to about 5500 A. The sensitivity of the invention compositions at the longer wavelengths may be increased by adding certain compounds which serve as photosensitizers. Suitable photosensitizers are well known in the art and may be certain dyes or aromatic amines. See, for example, U.S. Pat. 3,042,516 and Mees, The Theory of the Photographic Process, The Macmillan Company, 1952, particularly at pages 317–493.

Among the light sources which have been employed are the sun, a sunlamp, a projector lamp, an electronic flash gun, and a germicidal lamp. The light exposure time will vary from a fraction of a second to several minutes depending upon the intensity of the light, its distance from the light-sensitive composition, the nature and amount of light-sensitive composition, and the intensity of color in the image desired.

D. Examples

Representative examples further illustrating the present invention follow:

EXAMPLE 1

The room temperature dark stabilities of light-sensitive compositions containing various photooxidants and analytically pure aminotriarylmethanes (listed in Table I below) were determined as follows:

A 2.6 sq. in. section of Whatman No. 1 filter paper treated with 0.25 ml. of a solution $12.5\times10^{-3}$ molar in the aminotriarylmethane and $25\times10^{-3}$ molar in 1,2-dibromo-1,1,2,2-tetrachloroethane in 50/50 by volume N,N-dimethylformamide/benzene solution is dried at room temperature. Each square inch of the dried paper contains about 0.5 mg. of aminotriarylmethane and 0.8 mg. of 1,2-dibromo-1,1,2,2-tetrachloroethane.

A portion of each paper is exposed to a 275 watt sun lamp to determine the color-forming ability of each photooxidant-aminotriarylmethane combination. Each paper is then stored in the dark under conditions simulating ordinary darkroom storage conditions to determine its room temperature dark stability. After two weeks' storage the papers are examined visually and any change in the unexposed portion of the paper is noted.

The aminotriarylmethanes are placed in one of four classes according to the room temperature dark stability of the photosensitive composition systems containing them. These classes are:

Class I—no color change
Class II—slight, but definite color change
Class III—considerable color change
Class IV—pronounced color change.

Table I shows the results.

TABLE I.—STORAGE STABILITY OF LIGHT-SENSITIVE COMPOSITIONS CONTAINING AMINOTRIARYLMETHANES

CLASS I

| Test No.: | |
|---|---|
| 1 | Tris(4-diethylamino-o-tolyl)methane. |
| 2 | Bis(4-diethylamino-o-tolyl)(p-methoxyphenyl)methane. |
| 3 | Bis(4-diethylamino-o-tolyl)-2-thienylmethane. |
| 4 | Bis[4-(N-benzyl-N-ethylamino)-o-tolyl](p-methoxyphenyl)-methane. |
| 5 | Bis(4-diethylamino-o-tolyl)phenylmethane. |
| 6 | Bis(4-diethylamino-o-tolyl)1-naphthylmethane. |
| 7 | Bis(4-diethylamino-o-tolyl)(2,4-dimethoxylphenyl)-methane. |
| 8 | Bis(4-diethylamino-o-tolyl)(3,4-methylenedioxyphenyl)-methane zinc chloride salt. |
| 9 | Bis(4-diethylamino-2,5-xylyl)phenylmethane. |
| 10 | Bis(4-diethylamino-o-tolyl)(p-benzylthiophenyl)methane. |
| 11 | Bis(4-diethylamino-1-naphthyl)(4-diethylamino-o-tolyl)-methane. |

CLASS II

| Test No.: | |
|---|---|
| 12 | Bis(p-dimethylaminophenyl)(o-chlorophenyl)methane. |
| 13 | Bis(p-benzylethylaminophenyl)phenylmethane. |
| 14 | Bis(p-diethylaminophenyl)(o-chlorophenyl)methane. |
| 15 | Bis(p-diethylaminophenyl)(o-bromophenyl)methane. |
| 16 | Tris(p-diethylaminophenyl)methane. |
| 17 | Bis[p-(2-cyanoethyl)ethylaminophenyl][p-(2-cyanoethyl)-methylaminophenyl]methane. |
| 18 | Bis[p-(2-cyanoethyl)(2-hydroxyethyl)aminophenyl](4-diethylamino-o-tolyl)methane. |
| 19 | Bis(p-diethylaminophenyl)phenylmethane. |
| 20 | Bis(p-dipropylaminophenyl)phenylmethane. |
| 21 | Bis(p-sec.-butylethylaminophenyl)phenylmethane. |
| 22 | Bis(4-ethylamino-m-tolyl)(o-hydroxyphenyl)methane. |
| 23 | Tris(p-diethylaminophenyl)methane zinc chloride hydrochloride double salt. |
| 24 | 1,4-bis[bis(p-dimethylaminophenyl)methyl]benzene. |

CLASS III

| Test No.: | |
|---|---|
| 25 | Bis(p-diethylaminophenyl)phenylmethane. |
| 26 | Bis(p-diethylaminophenyl)(p-dimethylaminophenyl)-methane. |
| 27 | 1,4-bis[bis(4-ethylamino-m-tolyl)methyl]benzene. |
| 28 | Bis(p-diethylaminophenyl)(4-ethylamino-1-naphthyl)-methane. |
| 29 | Do. |
| 30 | Bis(4-amino-2,3-dimethylphenyl)phenylmethane. |
| 31 | Bis(4-amino-o-tolyl)(4-diethylamino-o-tolyl)methane; |
| 32 | Bis(4-amino-o-tolyl)phenylmethane. |
| 33 | Bis(p-aminophenyl)phenylmethane. |
| 34 | Bis(p-sec.-butylaminophenyl)phenylmethane. |

Table I—Continued

CLASS IV

| Test No.: | |
|---|---|
| 35 | Bis(4-diethylamino-m-tolyl)(o-methoxyphenyl)methane. |
| 36 | Bis(p-dimethylaminophenyl)(p-hydroxyphenyl)methane. |
| 37 | Bis(4-amino-2,5-dimethoxyphenyl)(p-diethylaminophenyl)methane. |
| 38 | Bis(4-amino-2,5-xylyl)(p-dimethylaminophenyl)methane. |
| 39 | Bis(4-methylamino-m-tolyl)phenyl methane. |
| 40 | Bis(4-ethylamino-m-tolyl)(o-chlorophenyl)methane. |
| 41 | Bis(4-amino-3,5-diethylphenyl)(p-methoxyphenyl)-methane. |
| 42 | Bis(4-amino-3,5-diethyl)phenylmethane. |
| 43 | Bis(4-amino-3,5-xylyl)(o-chlorophenyl)methane. |
| 44 | Tris(p-dimethylaminophenyl)methane. |
| 45 | Bis(p-methylaminophenyl)(o-hydroxyphenyl)methane. |
| 46 | Tris(p-hydroxyphenyl)methane. |
| 47 | Bis(4-ethylamino-m-tolyl)(m-hydroxyphenyl)methane. |
| 48 | (p-Diethylaminophenyl)di-2-thienylmethane. |
| 49 | Bis(4-amino-2,5-xylyl)phenylmethane. |

After an additional dark storage at room temperature for 18 months, the compositions of Table I are unchanged in their classification.

The data summarized in Table I clearly demonstrate that aminotriarylmethanes which provide photosensitive compositions that form substantially no color during storage, possess the structural features of the aminotriarylmethanes employed in the compositions of this invention. In contrast, triarylmethanes which do not possess these structural features develop color during storage.

EXAMPLE 2

In another series of light-sensitive compositions, various halogenated organic compounds are used as photooxidants with (a) tris(4-diethylamino-o-tolyl)methane (Leuco Dye I) a storage-stable aminotriarylmethane of the invention and (b) tris(p-diethylaminophenyl)methane (Leuco Dye II) an aminotriarylmethane which differs in structure from Leuco Dye I only in lacking methyl groups ortho to the methane carbon atom. The halogenated organic compounds employed are carbon tetrabromide, iodoform, hexachloroethane, N-bromosuccinimide and p-toluenesulfonyl chloride.

Sections of filter paper are impregnated with each of these dyes in combination with each of the halogen-containing photooxidants in order to determine the storage stability of the resulting light-sensitive compositions. The papers are prepared by treating separate 2.6 sq. in. sections of paper with 0.25 ml. of the following solutions made with 50/50 N,N-dimethylformamide/benzene as solvent.

(1) 0.0125 molar in tris(4-diethylamino-o-tolyl)methane 0.025 molar in the halogenated organic compound
(2) 0.0125 molar in tris(p-diethylaminophenyl)methane 0.025 molar in the halogenated organic compound The treated paper is allowed to dry at room temperature and a portion of each specimen is illuminated with a 275 watt sun lamp. It is found that each of the compositions forms color.

The reflectance optical densities of the unexposed areas are read immediately on a MacBeth Quantalog color densitometer using a yellow filter. The test papers are stored in the dark and the optical densities of the unexposed areas are redetermined after storage intervals of 7 and 19 days. The results are as given in Table II below.

TABLE II.—ROOM TEMPERATURE DARK COLOR FORMATION OF TRIS-(4-DIETHYLAMINO-o-TOLYL)METHANE (I) AND OF TRIS(p-DIETHYLAMINOPHENYL)METHANE (II) WITH HALOGENATED COMPOUNDS

| | | | Optical density | |
|---|---|---|---|---|
| Test No. | Halogenated compound | Time, days | Leuco Dye I and halogen compound | Leuco Dye II and halogen compound |
| 50 | Carbon tetrabromide | 0 | 0.25 | 0.48 |
| | | 7 | 0.24 | 0.82 |
| | | 19 | 0.27 | 1.04 |
| 51 | Iodoform | 0 | 0.28 | 0.37 |
| | | 7 | 0.25 | 0.73 |
| | | 19 | 0.27 | 1.01 |
| 52 | Hexachloroethane | 0 | 0.26 | 0.33 |
| | | 7 | 0.25 | 0.75 |
| | | 19 | 0.26 | 0.80 |
| 53 | N-bromosuccinimide | 0 | 0.31 | 0.78 |
| | | 7 | 0.31 | 0.86 |
| | | 19 | 0.33 | 0.90 |
| 54 | p-Toluenesulfonyl chloride | 0 | 0.28 | 0.84 |
| | | 7 | 0.27 | 0.99 |
| | | 19 | 0.28 | 0.99 |

From the results of Table II, it seen that, whereas essentially no color change occurs on dark storage of the various compositions containing organic halogen compounds and tris(4-diethylamino-o-tolyl)methane, an aminotriarylmethane of the invention, distinct color changes indicative of poor storage stability occur with those compositions containing tris(p-diethylaminophenyl) methane, an aminotriarylmethane having no substituent in positions ortho to the methane carbon atom.

EXAMPLE 3

In still another series of dark storage stability tests, light-sensitive compositions containing tris(4-diethylamino-o-tolyl)methane (Leuco Dye I), tris(4-diethylamino-o-tolyl)methane zinc chloride hydrochloride double salt (Leuco Dye I—$ZnCl_2 \cdot HCl$), and tris(p-diethylaminophenyl)methane (Leuco Dye II), each in combination with various organic photooxidants, are compared.

The comparisons are made after a two-year dark storage of coatings of the compositions on filter paper with the results shown in Table III. During the early stages of the storage tests it is noted that the compositions containing Leuco Dye II usually develop color within the first week of dark storage.

The test papers are prepared by streaking a sheet of filter paper with 0.25 ml. of a solution prepared from 50 mg. of the given photooxidant, 50 mg. of the given aminotriarylmethane and 25 ml. of N,N-dimethylformamide followed by air drying.

TABLE III.—ROOM TEMPERATURE DARK STABILITY OF LIGHT-SENSITIVE COMPOSITIONS

| | | Color formation after 2 years' dark storage | | |
|---|---|---|---|---|
| Test No. | Photooxidant | Leuco Dye I | Leuco Dye I $ZnCl_2$-HCl | Leuco Dye II |
| 55 | 1,1,1,2,2,3,3-heptachloropropane | Very slight | None | Pronounced. |
| 56 | Hexachloroethane | None | do | Do. |
| 57 | 1,2,3,4-tetrabromobutane | do | do | Do. |
| 58 | 2-benzothiazolyl disulfide | do | do | Do. |

Again, it is seen that an aminotriarylmethane of the invention composition in combination with different photooxidants provides a long-term storage-stable composition, while a composition containing related methanes lacking a critical ortho substituent in the p-diethylaminophenyls develops color in storage. The results obtained in Examples 1–3 can also be obtained with other aminotriarylmethanes and other photooxidants defined herein.

As indicated hereinbefore the invention compositions are particularly useful in the fields of photography and the photographic arts as storage-stable, light-sensitive compositions capable of producing images in a variety of colors by a dry, non-silver process. Photographic dye-printable fabrics, paper and similar fibrous sheet material are provided by coatings of the invention compositions. The compositions also are useful as components of light-sensitive films, papers and other systems required in the photocopy field for blueprints and technical information, the reproduction of typed and printed pages, and images obtained by transmission through microfilm.

The preceding representative examples may be varied within the scope of the present total specification disclosure, as understood and practiced by one skilled in the art, to achieve essentially the same results.

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. A storage-stable, light-sensitive composition comprising (A)(1) at least one aminotriarylmethane wherein at least two of the aryl groups are phenyl groups having (a) an $R_1R_2N$-substituent in the position para to the bond to the methane carbon atom wherein $R_1$ and $R_2$ are each groups selected from $C_1$ to $C_{10}$ alkyl, 2-hydroxyethyl, 2-cyanoethyl, benzyl or phenyl, and (b) a group ortho to the methane carbon atom which is selected from lower alkyl, lower alkoxy, fluorine, chlorine, bromine or butadienylene which when joined to the phenyl group forms a naphthalene ring; and the third aryl group, when different from the first two, is selected from thienyl, furyl, oxazlyl, thiazolyl, indolyl, benzoxazoyl, benzothiazolyl, phenyl, 1-naphthyl or such aforelisted groups substituted with lower alkyl, lower alkoxy, methylenedioxy, fluoro, chloro, bromo, amino, lower alkylamino, lower dialkylamino, lower alkylthio, hydroxy, carboxy, carbonamido, lower carbalkoxy, lower alkylsulfonyl, lower alkylsulfonamido, $C_6$ to $C_{10}$ arylsulfonamido, nitro or benzylthio; or (A)(2) at least one salt of an aminotriarylmethane defined above which is derived from an acid which forms a salt with an anilino amino group; in intimate admixture with (B) at least one organic photooxidant reactive with the component defined in (A)(1) or (A)(2) above under the influence of light selected from (a) a halogenated compound having a bond dissociation energy to produce a first halogen as a free radical of not less than about 40 kilogram calories per mole, and having at least one active halogen attached to a carbon atom having not more than one hydrogen attached thereto, (b) a sulfonyl halide, R—$SO_2$—X wherein R is a member of the group consisting of alkyl, alkenyl, cycloalkyl, aryl, alkaryl, or aralkyl and X is chlorine or bromine, (c) a sulfenyl halide of the formula R′—S—X′ wherein R′ and X′ have the same meaning as R and X in $RSO_2X$ above, (d) a tetraaryl hydrazine, (e) a benzothiazolyl disulfide, (f) a polymethacrylaldehyde, or (g) an alkylidene 2,5-cyclohexadien-1-one and (c) an inert solvent.

2. The composition of claim 1 wherein the organic photooxidant (B) is a halogenated hydrocarbon, a halogenated substituted hydrocarbon or a sulfonyl halide.

3. The composition of claim 1 wherein the organic photooxidant (B) is a polyhalo aliphatic hydrocarbon.

4. The composition of claim 1 wherein the aminotriarylmethane (A)(1) is represented by the structural formula

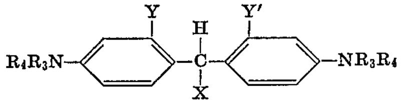

wherein $R_3$ and $R_4$ are selected from lower alkyl or benzyl; Y and Y′ are lower alkyl, and X is selected from

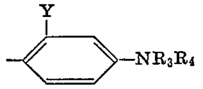

p-methoxyphenyl, 2-thienyl, phenyl, 1-naphthyl, 2,3-dimethoxyphenyl, 3,4-methylenedioxyphenyl, or p-benzothiophenyl; and wherein the salt portion of the salt defined in (A)(2) of claim 1 is derived from a strong mineral acid, a strong organic acid, or a metallic halide Lewis acid.

5. The composition of claim 4 wherein the organic photooxidant (B) is a halogenated hydrocarbon, a halogenated substituted hydrocarbon or a sulfonyl halide.

6. The composition of claim 4 wherein the organic photooxidant (B) is a polyhalo aliphatic hydrocarbon.

7. An article comprising a substrate coated with a composition consisting essentially of (A)(1) at least one aminotriarylmethane wherein at least two of the aryl groups are phenyl groups having (a) an $R_1R_2N$-substitutent in the position para to the bond to the methane carbon atom wherein $R_1$ and $R_2$ are each groups selected from $C_1$ to $C_{10}$ alkyl, 2-hydroxyethyl, 2-cyanoethyl, benzyl or phenyl, and (b) a group ortho to the methane carbon atom which is selected from lower alkyl, lower alkoxy, fluorine, chlorine, bromine or butadienylene which when joined to the phenyl group forms a naphthalene ring; and the third aryl group, when different from the first two, is selected from thienyl, furyl, oxazylyl, thiazolyl, indolyl, benzoxazoyl, benzothiazolyl, phenyl, 1-naphthyl or such aforelisted groups substituted with lower alkyl, lower alkoxy, methylenedioxy, fluoro, chloro, bromo, amino, lower alkylamino, lower dialkylamino, lower alkylthio, hydroxy, carboxy, carbonamido, lower carbalkoxy, lower alkylsulfonyl, lower alkylsulfonamido, $C_6$ to $C_{10}$ arylsulfonamido, nitro or benzylthio; or (A)(2) at least one salt of an aminotriarylmethane defined above which is derived from an acid which forms a salt with an anilino amino group; in intimate admixture with (B) at least one organic photooxidant reactive with the component defined in (A)(1) or (A)(2) above under the influence of light selected from (a) a halogenated compound having a bond dissociation energy to produce a first halogen as a free radical of not less than about 40 kilogram calories per mole, and having at least one active halogen attached to a carbon atom having not more than one hydrogen attached thereto, (b) a sulfonyl halide, R—$SO_2$—X wherein R is a member of the group consisting of alkyl, alkenyl, cycloalkyl, aryl, alkaryl, or aralkyl and X is chlorine or bromine, (c) a sulfenyl halide of the formula R′—S—X′ wherein R′ and X′ have the same meaning as R and X in $RSO_2X$ above, (d) a tetraaryl hydrazine, (e) a benzothiazolyl disulfide, (f) a polymethacrylaldehyde, or (g) an alkylidene-2,5-cyclohexadien-1-one.

8. The article of claim 7 wherein the substrate is a film.

9. The article of claim 7 wherein the substrate is paper.

10. Process for forming a colored article comprising irradiating the article of claim 7 with light having a wavelength from about 2000 A. to about 8000 A.

11. A composition comprising (A)(1) at least one aminotriarylmethane wherein at least two of the aryl groups are phenyl groups having (a) an $R_1R_2N$ substituent in the position para to the bond to the methane carbon atom wherein $R_1$ and $R_2$ are each groups selected from $C_1$ to $C_{10}$ alkyl, 2-hydroxyethyl, 2-cyanoethyl, benzyl or phenyl, and (b) a group ortho to the methane carbon atom which is selected from lower alkyl, lower alkoxy, fluorine, chlorine, bromine or butadienylene which when joined to the phenyl group forms a naphthalene ring; and the third aryl group, when different from the first two, is selected from thienyl, furyl, oxazylyl, thiazolyl, indolyl, benzoxazoyl, benzothiazolyl, phenyl, 1-naphthyl or such aforelisted groups substituted with lower alkyl, lower alkoxy, methylenedioxy, fluoro, chloro, bromo, amino, lower alkylamino, lower dialkylamino, lower alkylthio, hydroxy, carboxy, carbonamido, lower carbalkoxy, lower alkylsulfonyl, lower alkylsulfonamido, $C_6$ to $C_{10}$ arylsulfonamido, nitro or benzylthio; or (A)(2) at least one salt of an aminotriarylmethane defined above which is derived from an acid which forms a salt with an anilino amino group;

(B) at least one organic photooxidant reactive with the component defined in (A)(1) or (A)(2) above under the influence of light selected from (a) a halogenated compound having a bond dissociation energy to produce a first halogen as a free radical of not less than about 40 kilogram calories per mole, and having at least one active halogen attached to a carbon atom having not more than one hydrogen attached thereto, (b) a sulfonyl halide, R—$SO_2$—X wherein R is a member of the group consisting of alkyl, alkenyl, cycloalkyl, aryl, alkaryl, or aralkyl and X is chlorine or bromine, (c) a sulfenyl halide of the formula R′—S—X′ wherein R′ and X′ have the same meaning as R and X in $RSO_2X$ above, (d) a tetraaryl hydrazine, (e) a benzothiazolyl disulfide, (f) a polymethacrylaldehyde, or (g) an alkylidene-2,5-cyclohexadien-1-one; and (C) a polymer matrix.

12. Process for forming a colored composition comprising irradiating the composition of claim 11 with light having a wavelength from about 2000 A. to about 8000 A.

References Cited

UNITED STATES PATENTS 3,102,810 9/1963 Sprague et al. ---------- 96—90

FOREIGN PATENTS 1,356,450 2/1964 France ------------- 96—90PC

WILLIAM D. MARTIN, Primary Examiner

J. E. MILLER, Jr., Assistant Examiner

U.S. Cl. X.R.

96—86, 87, 88, 89, 90; 260—309